United States Patent Office 3,347,928
Patented Oct. 17, 1967

3,347,928
PROCESS OF OXIDIZING HYDROXY PHENYL ALANINES TO HYDROXY BENZYL ALKYL KETONES
David Taub, Metuchen, and Norman L. Wendler, Summit, N.J., assignors to Merck & Co., Inc., Rahway, N.J., a corporation of New Jersey
No Drawing. Filed Feb. 1, 1963, Ser. No. 255,643
9 Claims. (Cl. 260—590)

This invention relates to a process for converting certain amino acids to ketones. More specifically, this invention relates to a process for converting an α-lower alkyl-3,4-dihydroxyphenylalanine to a 3,4-dialkoxybenzyl lower alkyl ketone. More specifically, it relates to such a process in which the phenylalanine is α-methyl-3,4-dihydroxyphenylalanine. More specifically also, it relates to a process of preparing 3,4-dihydroxy and 3,4-alkoxy hydroxy benzyl lower alkyl ketones from α-lower alkyl-3,4-dihydroxy and 3,4-alkoxy hydroxy phenyl alanine, and to intermediate steps in such processes, and to the hitherto unknown synthesis of α-lower alkyl 3,4-dihydroxyphenylalanines from 3,4-dihydroxybenzyl lower alkyl ketones.

The discovery that α-methyl-3,4-dihydroxyphenyl alanine is a potent anti-hypertensive is a great advance in the treatment of hypertension. This compound is produced from 3,4-dimethoxybenzyl methyl ketone by one of two processes, one of which proceeds through a hydantoin intermediate and the other through an amino nitrile, but both of which produce α-methyl-3,4-dimethoxyphenylalanine, which is then hydrolyzed to the final product. Both syntheses produce a racemic mixture. The antihypertensive activity, however, resides solely in the L-form and the resolution of the racemate produces large quantities of therapeutically unusable D-form. This results in an economic waste which must be passed on to the consumer in the form of higher prices for the drugs. There is a need for a method of converting this therapeutically unusable D-form into the L-form in order to reduce this cost factor. Such conversion cannot easily be effected directly.

We have found that the intermediate dimethoxybenzyl lower alkyl ketone intermediate can be regenerated from the amino acid by a process which comprises, in brief, the protection of the amino group, the alkylation of the hydroxyls and removal of the protecting group followed by oxidation of the resulting alkoxy amino acid. This oxidation can be especially carried out with a reagent which is capable of increasing the oxidation stage of the nitrogen of the amino group. We have further found out that this oxidation can also be carried out directly on the dihydroxy amino acid although with lower yields, thus providing a one-step conversion of amino acid to methyl ketone.

The first step in the process of this invention comprises (see the flow sheet) the acylation of the amino acid in order to protect the amino group during the

FLOW SHEET

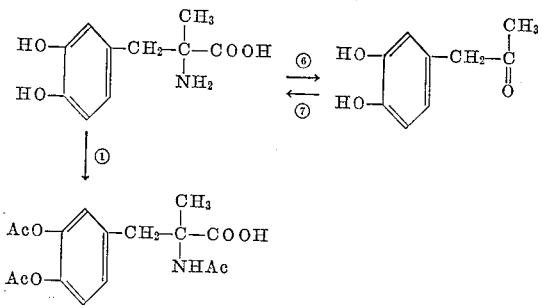

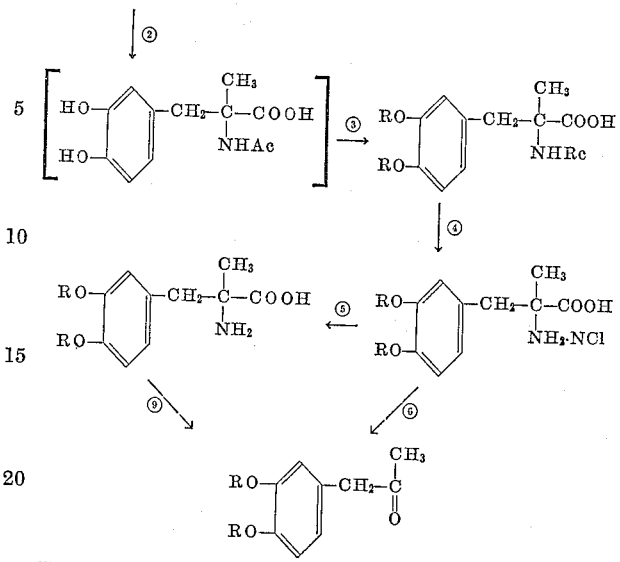

Equivalents:
Ac=carboxylic acyl.
R=alkyl, aralkyl, alkenyl, aralkenyl.
Reagents:
1=Acylation by any known acylation method such as acyl halide plus acid binder, transesterification, or especially acid anhydride plus an organic base.
2=Contact with aqueous caustic.
3=Alkylation with alkyl halide of sulfate.
4=Heating with aqueous acid.
5=Cautious basification with dilute base.
6=Oxidation with a variety of agents (see specifications).
7=Reconstitution of amino acid by hydantoin or aminonitrile procedures.

alkylation step. Any carboxylic acid acylating agent may be used for this protection such as anhydrides or acid halides derived from alkanoic acids having up to 5 carbon atoms acetic acid, butyric acid, propionic acid, valeric acid, as well as higher alkanoic acids up to and including stearic acid, alkenoic acids such as acrylic and crotonic, aryloic acids such as benzoic acid, substituted benzoic acids, toluic acid, substituted toluic acids and the like, arylalkanoic acids such as phenylacetic acid and aryl alkenoic acids such as cinnamic acid. Preferably, because of cost, ease of removal and similar factors, one uses a lower alkanoic acid, especially acetic (although formic may also be used if a mixed formic acetic acid anhydride is used as the alkylating agent). The protecting group must be a group which is easily split from the hydroxyls but removed from the nitrogen with not quite the same ease.

The starting materials in this process are the α-lower alkyl-3,4-dihydroxyphenylalanines, especially the D-form since this process is intended to recycle the D-form into the racemate. The acylation is carried out with the acyl halide, anhydride, or by tranesterification or by any other known acylation method. Especially useful is the reaction with the acid anhydride either using an excess of the anhydride as its own solvent or using another solvent, especially an organic base such as pyridine or dimethylaniline. Also useful is reaction with an acid halide, which normally is carried out in another solvent with an acid acceptor present or with an acid azide. The acid acceptor may be an organic base used as a solvent or as an added ingredient it may be an inorganic acceptor such as calcium carbonate, sodium carbonate, or the alkali metal salt of the acylating acid. Acylation normally occurs quite readily to form an O,O,N-triacyl derivative. In the case of acetic anhydride, which is preferred, acylation occurs in pyridine solution at room temperature in a matter of a few hours. With other reagents and acylation methods, differing times and temperatures will be found useful.

The next step in the synthesis is the deacylation of the phenolic hydroxyl groups. The acylation has as its purpose the protection of the nitrogen during the alkylation of the hydroxyls. However, one cannot acylate the nitrogen without also acylating the hydroxyls. Fortunately, for this process the acyl esters of the phenolic hydroxyls are found to be much more easily saponified than the acyl amino group and the hydroxyls will deacylate upon contact with aqueous caustic. One can use for this purpose any desired caustic such as sodium hydroxide, potassium hydroxide, lithium hydroxide, calcium hydroxide, barium hydroxide, ammonium hydroxide, quaternary ammonium hydroxides, aqueous solutions of primary amines and secondary amines or even the carboxylic alkali metals. Preferably, we use an aqueous solution of potassium or sodium hydroxide. The time, temperature and caustic concentration all affect the saponification of the hydroxyls and these must be adjusted to effect this reaction without hydrolysis of the acylamino group. Conveniently, with 6 N potassium hydroxide at room temperature, complete deacylation is achieved rapidly.

It is important in the deacylation that there be present an inert atmosphere to prevent the decomposition of the free phenolic compounds from air oxidation. The inert atmosphere can be any gas not reacting with the compound or the base. Preferably, it is a noble gas or nitrogen.

Because of this tendency of the free hydroxyls to oxidize in alkaline solution, the alkylation normally is done immediately on the reaction mixture from the deacylation of the hydroxyls while keeping the N-acylphenylalanine under an inert atmosphere. During the alkylation the reaction mixture must continue to be kept alkaline with the addition of further alkali as needed and this, of course, continues to expose the reaction mixture to the danger of oxidation.

As an alkylating reagent, one may use either an alkyl halide or an alkyl sulfate. The word "alkyl" is used because the normal protecting group for the phenolic hydroxyls is an alkyl group, especially a lower alkyl such as methyl. It may, however, be an aralkyl such as benzyl, aralkenyl such as styryl, or an alkenyl such as allyl or crotyl, or an alkylene or aralkylene joined to both oxygens, such as methylene and benzylidene, although the economics of the situation are such that these are unlikely. Except when the group is methyl or ethyl, the alkyl halides are used as the alkylating agent. In the case of ethyl and methyl, it is preferable to use diethyl or dimethyl sulfate as the alkylating agent. Ease of removal later during the resynthesis of α-MethylDOPA must be kept in mind in choosing the alkyl group and for this reason, it is preferably a methyl group.

It should be noted that this process of alkylation of the phenolic hydroxyls also simultaneously esterifies the carboxylic acid group to a small degree. This, however, can be hydrolyzed under acidic conditions. Since the deacylation of the acylamino group is also carried out in acid solution, it is preferably combined with this step, but separate hydrolysis and deacylation steps are clearly within the embodiments of this invention.

The saponification and deacylation are carried out with acid. The purpose is to remove from the amino group the protecting group in order that it may be subsequently attacked and removed to form the ketone. As pointed out above, it is usually combined with the hydrolysis of any carboxylic ester formed during the alkylation step. The acids to be used in the deacylation may be any acid such as a mineral acid, a sulfonic acid, an organic acid, organic carboxylic acids and the like. Hydrolysis by heating an aqueous suspension under pressure or in a high boiling water-miscible solvent may also serve to accomplish this hydrolysis. Those acids which are weaker in acid strength need greater additional heat and time in order to effect the deacylation. Consequently, it is preferable to use acids with an acid ionization constant greater than $10^{-5}$ and especially preferable to use mineral acids such as sulfuric acid, hydrochloric acid and the like. It is recommended that these be used in at least 0.1 normal strength in order to cut the time and temperature to practical limits. Conveniently, one uses 6 N hydrochloric acid. This acid at reflux for about 2 hours is sufficient to effect deacylation. The product from the deacetylation step is an α-alkyl-3,4-dialkoxyphenylalanine.

In order to form the desired ketone intermediate for recycling, it is necessary to substitute a keto-oxygen for the amino and carboxyl groups. This is done by an oxidation step. Generally, any oxidizing agent or oxidizing system can be used as for example, chromic acid in acetic acid, potassium permanganate and the like. The fundamental necessity is to increase the oxidation stage of the amino nitrogen. Consequently, a preferred type of oxidation is reaction with any reagent which replaces one of the amino hydrogens with a substituent, raising the oxidation stage of the nitrogen. Typical reagents of this type are hypohalous acids and salts (which give N-halo amine intermediates) and peracids such as peracetic, perbenzoic or persulfuric acids (which give hydroxylamines). These intermediates decompose in solution to split off $CO_2$ and hydrogen halide or water to give an intermediate eneamine, or imine compound which undergoes hydrolysis to the desired ketone. Hypohalous acids, which are the preferred reagents, are usually used in the form of their salts such as sodium and calcium hypochlorite, sodium hypobromite and the like. They can also be used in the form of an alkyl hypohalite which will decompose to give a hypohalous acid. One can also use them in the free form as produced by dissolving a halogen in water, e.g., chlorine or bromine water. In the latter case it is advantageous to make the solution basic in order to aid formation of the N-halo amine intermediate, whereas the alkali hypohalites are already strongly basic.

The oxidative reaction is normally carried out, in the preferred embodiment by the addition of sodium hypochlorite to an aqueous solution of the α-alkyl-3,4-dialkoxyphenylalanine. The progress of the reaction is followed by spotting on starch-iodide paper to the point where no more sodium hypochlorite is consumed. The ketone is extracted with an organic solvent and isolated. It is then ready for recycling into the synthesis of the racemic amino acid. It is recovered in very good yield from the D-form of the amino acid.

An alternative embodiment of this invention comprises the direct oxidation of the D-α-alkyl-dihydroxyphenylalanine or the corresponding alkoxy hydroxyphenylalanine with hypohalous acid or a hypohalite. This is carried out in essentially the same manner as described above for the dialkoxy compounds. Although the yield generally is lower in this direct oxidation, it has the economic virtue of being a single step process. It is a further embodiment of this part of our invention that the resultant dihydroxybenzyl lower alkyl ketone can be converted back to racemic α-alkyl dihydroxyphenylalanine without the need of protecting the hydroxyls by alkylation. Up to now, the danger of decomposition and/or side reactions has led all chemists to synthesize dihydroxyphenylalanines with at least one hydroxyl alkylated. We have found that the dihydroxyphenylalanines can be formed directly by either the hydantoin or the amino nitrile route without needing such protection. In the one route, the dihydroxybenzyl ketone is agitated with aqueous ammonium carbonate and a water soluble cyanide to form a hydantoin derivative. In the other, the ketone is agitated with ammonium cyanide in an inert solvent (water or hydrocarbon) to form an amino nitrile. Either of these intermediates is readily converted to the alanine by heating above 140° under an inert atmosphere with a hydrohalic acid (preferably at least 4 N and preferably HCl or HBr.

A further modification of our invention permits the alkylation and oxidation to be carried out in one manipulation without isolation. In this modification, the α-alkyl-dihydroxyphenylalanine is dissolved in excess caustic solution and a dialkyl sulfate is added with stirring at ambient temperature. The theoretical amount of dialkylsulfate is two moles (only one alkyl group being readily available for alkylation). In practice, because of the competing reaction with the excess caustic, up to four moles per mole of phenylalanine compound must be used. The result is, surprisingly, that the hydroxyls are preferentially alkylated instead of the amino group. The solution, containing a mixture of α-alkl dialkoxy and alkoxyhydroxy phenylalanine, can then be oxidized as before, preferably by addition of a hypohalite, although overall yields tend to be lower. So long as at least one hydroxyl is alkylated, there is sufficient protection to permit the oxidation to the ketone. The result of this modification is to permit, in one manipulation, without isolation, the conversion of the alanine to an alkylated benzyl ketone (sometimes a mixture of such) which can be recycled in the preparation of the racemic phenylalanine.

Our invention can be illustrated by the following examples:

EXAMPLE 1

D α-methyl-3,4-dihydroxyphenylalanine triacetate

Acetic anhydride, 400 cc., is added portionwise to a stirred slurry of 100 g. of D-α-methyl-3,4-dihydroxyphenylalanine in 400 cc. of dry pyridine. A clear yellow solution is obtained after ½ hour, and stirring is maintained at room temperature for 16 hours. The reaction mixture is concentrated in vacuo to a thick slurry, cooled in an ice bath and acidified with 6 N hydrochloric acid. Dropwise addition of 200 cc. of water results in immediate precipitation of triacetate which is aged, filtered, washed with water and dried to afford 131.5 g. of D α-methyl-3,4-dihydroxyphenylalanine triacetate. The latter gives a negative methanolic ferric chloride test and melts at 175–178°. A sample recrystallized from hot acetone melts at 178–180°;

$\lambda_{max.}^{CH_3OH}$ 268 m$\mu$ ($E_{cm.}^{1\%}$ 11.2), 263 m$\mu$ ($E_{cm.}^{1\%}$ 12.3);

$\lambda_{max.}^{CHI}$ 2.96, 3–4.2, 5.69, 5.85, 5.9, 6.15 and 6.6$\mu$

Analysis.—Calcd. for $C_{16}H_{19}O_7N$: C, 56.97; H, 5.68; N, 4.15. Found: C, 57.20; H, 6.17; N, 4.06.

EXAMPLE 2

D α-methyl-N-acetyl-3,4-dimethoxyphenylalanine

A stream of nitrogen is bubbled through 200 cc. of 4 N potassium hydroxide solution for 20 minutes and the alkaline solution is cooled to 5–10° prior to the addition of 50.0 (0.148 mole) of D α-methyl-3,4-dihydroxyphenylalanine triacetate (nitrogen flow maintained throughout). The cooling bath is removed and 50 cc. of dimethyl sulfate (0.56 mole) and 100 cc. of 4 N potassium hydroxide are then added with occasional use of cooling bath to maintain the temperature at about 25°. An essentially negative methanolic ferric chloride reaction is obtained after stirring for 30 minutes. An additional 25 cc. of dimethyl sulfate (0.28 mole) followed by 50 cc. of 4 N potassium hydroxide are added and stirring is continued for an additional 30 minutes. The strong basic reaction mixture is then extracted with ether.

The ethereal solution is washed to neutrality with water, salt solution, dried over magnesuim sulfate and concentrated in vacuo to give 2.5 g. of crystalline D α-methyl-N-acetyl-3,4-dimethoxyphenylalanine methyl ester, M.P. 127–129° after recrystallization from acetone-ether.

$\lambda_{max.}^{CH_3CN}$ 233 m$\mu$ $E_{cm.}^{1\%}$ 300, 280 m$\mu$ $E_{cm.}^{1\%}$ 101. $[\alpha]_D^{Acetone}$ +45.5°

Analysis.—Calcd. for $C_{15}H_{21}O_5N$: C, 61.01; H, 7.17; N, 4.74. Found: C, 61.12; H, 6.83; N, 5.14.

The aqueous solution is chilled and acidified with concentrated hydrochloric acid to yield a heavy precipitate of the N-acetyl dimethylether. The latter is aged and filtered. It can be used directly in the next step. Alternatively, this product (M.P. 182–185°) is dissolved in hot ethyl acetate, washed with salt solution, dried over magnesium sulfate and concentrated under reduced pressure to give 35.10 g. of D α-methyl-N-acetyl-3,4-dimethoxyphenylalanine in fine needles, M.P. 186–187°.

$\lambda_{max.}^{CH_3CN}$ 232 m$\mu$ $E_{cm.}^{1\%}$ 319, 288 m$\mu$ $E_{cm.}^{1\%}$ 106. $[\alpha]_D^{Acetone}$ +21.0°

Analysis.—Calcd. for $C_{14}H_{19}O_5N$: C, 59.78; H, 6.81; N, 4.98. Found: C, 60.10; H, 6.77; N, 4.74.

The aqueous filtrate is saturated with salt and extracted with ethyl acetate and the organic phase washed with salt solution, dried over magnesium sulfate and concentrated in vacuo to afford an additional 4.97 g. of the N-acetyl dimethylether, M.P. 181–184° (total 96.5% of theory). The combined product, namely the N-acetyl amino acid and its methyl ester, correspond to a 100% yield of utilizable methylation product.

EXAMPLE 3

D α-methyl-3,4-dimethoxyphenylalanine hydrochloride monohydrate

The α-methyl-N-acetyl-3,4-dimethoxyphenylalanine produced in Example 2 (160 g.) in 1,800 cc. of 6 N hydrochloric acid, is magnetically stirred and refluxed for 2 hours. The light brown reaction mixture is concentrated in vacuo to dryness, flushed three times with tertiary-butanol, twice with toluene and twice with ether to afford 161 g. (97%) of D α-methyl-3,4-dimethoxyphenylalanine hydrochloride, M.P. 235–238° with phase change from granular to star-like needles at 192°. Crystallization from aqueous acetone gives the analytical sample, M.P. unchanged.

$\lambda_{max.}^{CH_3OH}$ 278 ($E_{cm.}^{1\%}$ 91), 231 ($E_{cm.}^{1\%}$ 278); $\lambda_{max.}^{Nujol}$ 2.86, 2.99, 3.7–5.0, 5.74, 6.17, 6.25, 6.59$\mu$ Analysis.—Calcd. for $C_{12}H_{18}O_4NCl \cdot H_2O$: C, 49.08; H, 6.86; N, 4.77; Cl, 12.07; K.F. 6.1% $H_2O$. Found: C, 48.93; H, 6.75; N, 4.81; Cl, 12.10; K.F. 5.7% $H_2O$.

EXAMPLE 4

D α-methyl-3,4-dimethoxyphenylalanine

By heating on the steam bath, 47 g. (0.16 mole) of the amine hydrochloride monohydrate produced in Example 3 is dissolved in one l. of isopropyl alcohol. The mixture is cooled to room temperature and through a dropping funnel, 90 cc. (1.33 mole) of propylene oxide is added dropwise with stirring. Precipitation starts within ½ hour after the addition is complete and the reaction mixture is subsequently stirred for 16 hours. The product is filtered and triturated twice with ether to afford 33.68 g. of D α-methyl-3,4-dimethoxyphenylalanine, M.P. 249–251° dec. with phase change from granular to microneedles at 234°. The filtrate is concentrated to dryness to afford an additional 1.97 g. of the product (total yield 93%). Crystallization from aqueous isopropanol raises the M.P. to 251–255°.

$\lambda_{max.}^{CH_3OH}$ 279 ($E_{cm.}^{1\%}$ 119), 232 ($E_{cm.}^{1\%}$ 354). $\lambda_{max.}^{KBr}$ 3.7–4.2, 6.25, 6.05, 6.55$\mu$ Analysis.—Calcd. for $C_{12}H_{17}O_4N$: C, 60.23; H, 7.16; N, 5.86. Found: C, 59.59; H, 6.79; N, 6.38.

EXAMPLE 5

3,4-dimethoxyphenylacetone

To a stirred solution (5–20–25°) of 956 mg. (400 millimol) of 3,4-dimethoxy-α-methylphenylalanine in 25 ml. of water is added 10 ml. of benzene. Sodium hypochlorite solution (14 ml. 0.3 N active Cl) is added dropwise over 20 minutes. The reaction is followed by spotting aliquots on starch-iodide paper. After each addition of hypochlorite a negative test is obtained in about 30 seconds. At the reaction's completion a positive test is obtained five minutes after addition of the last drop of hypochlorite. The layers are separated, the basic aqueous layer extracted twice with 50% benzene-ether, the combined organic phase dried over magnesium sulfate and concentrated to dryness in vacuo. The neutral residue (725 mg.; 92%) consists of 3,4-dimethoxyphenylacetone; I.R. identical with standard; N.M.R. in accord with this structure.

EXAMPLE 6

A stirred solution (at 20–25° C.) of 2.76 g. (10 millimol) of 3,4-dimethoxy-α-methylphenylalanine hydrochloride in 30 ml. of water and 20 ml. of benzene is neutralized by addition of 10.0 ml. of 1.00 N NaOH. Sodium hypochlorite solution (~37 cc. of ~0.3 N) is added dropwise (30 minutes) at which time a starch-iodide test is positive for 5 minutes. Work up as in Example 5 gives 1.69 g. (87%) of 3,4-dimethoxyphenylacetone of quality similar to that obtained from the free amino acid. The slightly lower yield is a reflection of impurities present in the sample of hydrochloride used.

Similar sodium hypochlorite oxidation of 3,4-dimethoxy-α-methylphenylalanine-N-acetate shows oxidant still present after 18 hours at 50–55°. Work up gives ca. 5% of neutral oil, mainly 3,4-dimethoxyphenylacetone and a good yield of recovered starting material, M.P. 186–189°.

EXAMPLE 7

3,4-dihydroxyphenylacetone

To a stirred solution of 844 mg. (4.00 millimol) of D(+)3,4-dihydroxy-α-methylphenylalanine in 20 ml. of 0.5 M borax buffer (3.1 g. boric acid in 50 ml. water; 8.5 ml. 1 N sodium hydroxide; add water to 100 ml.) pH 8.5, is added 10 ml. of benzene. Nitrogen is bubbled through the solution and 12.0 ml. of 0.34 N sodium hypochlorite solution is added dropwise. The red solution is acidified with dilute hydrochloric acid and extracted with ethyl acetate. The latter extract is dried and concentrated to dryness. The residue is triturated with chloroform, the latter suspension filtered and the filtrate concentrated to dryness under vacuum to give 3,4-dihydroxyphenylacetone 235 g. (~36%) with additional material still in the aqueous mother liquors.

$\lambda_{max}^{CHI}$ 2.75, 2.90 (O–H), 5.88 (C–O)

Acetylation of a probe, pyridine-acetic anhydride 25°, 18 hours gives 3,4-diacetoxyphenylacetone identical with authentic material.

EXAMPLE 8

3,4-dihydroxyphenylacetone

To a stirred suspension of 844 mg. under nitrogen (4.00 millimol) of D(−)3,4-dihydroxy-α-methylphenylalanine in 10 ml. of water is added 340 mg. (4.00 millimol) of sodium bicarbonate. Tertiary butyl hypochlorite (0.50 g.; 4.5 millimol) in 10 ml. t-butanol is added dropwise over 30 minutes. The deep-red reaction mixture is acidified with 5 ml. of 2 N hydrochloric acid and extracted thoroughly with ethylacetate. The ethyl acetate extract is washed with saturated salt solution, dried over magnesium sulfate and concentrated to dryness. The residue is triturated with chloroform, the latter suspension filtered and the filtrate concentrated to dryness to give 3,4-dihydroxyphenylacetone (335 mg.; 50% yield); I.R. spectrum identical to that of an authentic sample.

EXAMPLE 9

N-acetyl-α-methyl-3,4-dibenzyloxy-phenylalanine

To a stirred solution of 1.0 g. of potassium carbonate and 1.0 g. of α-methyl-3,4-dihydroxyphenylalanine triacetate in a mixture of 5 ml. of water and 10 ml. of methanol under a nitrogen atmosphere is added 1.0 ml. of benzyl bromide. The reaction mixture is stirred at room temperature for 1 hour, refluxed for 3 hours and then concentrated in vacuo. The residue is taken up in water and extracted with ethyl acetate. The aqueous layer is then acidified with 2.5 N hydrochloric acid and extracted with ethyl acetate. From the ethyl acetate solution after concentration in vacuo and crystallization of the residue from isopropanol there is obtained N-acetyl-α-methyl-3,4-dibenzyloxyphenylalanine as fine needles, M.P. 172–175°.

EXAMPLE 10

O,O-benzylidene-α-methyl-3,4-dihydroxyphenylalanine

Treatment of α-methyl-3,4-dihydroxyphenylalanine triacetate with α,α-dichlorotoluene, according to the procedure described in Example 9 affords as an amorphorous solid O,O-benzylidene-N-acetyl-α-methyl-3,4 - dihydroxyphenylalanine characterized by its infrared spectrum.

EXAMPLE 11

3-methoxy-4-hydroxyphenylacetone

To a stirred suspension of 600 mg. (under nitrogen) of 3-methoxy-4-hydroxy-α-methylphenylalanine in 20 ml. water at 25° is added 270 mg. of potassium bicarbonate and 10 ml. of benzene. Sodium hypochlorite solution (10 ml. of 0.30 N) is added dropwise (30 minutes). The mixture is acidified with 2.5 N hydrochloric acid and extracted with 1:1 ethylacetate-benzene. The extract is washed with saturated salt solution, dried over magnesium sulfate and concentrated to dryness to give 320 mg. (65%) of 3-methoxy-4-hydroxyphenylacetone, identified by comparison with an authentic sample (infrared and paper chromatography).

EXAMPLE 12

Combined methylation and oxidation of α-methyl-3,4-dihydroxyphenylalanine

To a stirred solution of 2.11 g. of 3,4-dihydroxy-α-methylphenylalanine in 12.5 ml. of 4 N potassium hydroxide (nitrogen atomsphere) is added 2.52 g. dimethylsulfate and the reaction mixture is stirred at room temperature for 1 hour. The pH of the solution is then adjusted to pH 8 with hydrochloric acid. There is then added 20 ml. of benzene and, over a period of 30 minutes, 31 ml. of 0.305 M sodium hypochlorite solution. The benzene layer is separated, dried over magnesium sulfate, and concentrated in vacuo to afford 3,4-dimethoxyphenyl acetone, identified by its infrared spectrum. The aqueous layer is acidified to congo red with hydrochloric acid and extracted with 1:1 benzene-ethyl acetate. From the extracts there is obtained, as a minor product, 3-methoxy-4-hydroxyphenylacetone, identified by its infrared spectrum.

EXAMPLE 13

α-Methyl-α-(3,4-dihydroxybenzyl)-hydantoin

A solution of 1.7 g. of 3,4-dihydroxyphenylacetone and 1.3 g. of sodium bisulfite in 10 ml. of water is extracted with benzene to remove non-ketonic impurities. The aqueous phase is transferred to a 50 ml. 3-neck flask, and, to the stirred mixture maintained under a carbon dioxide atmosphere, there is added 0.85 ml. of 28% ammonium hydroxide and 2.6 g. of ammonium bicarbonate. A solution of 600 mg. of sodium cyanide in 2.5 ml. of water is then added dropwise over 30 minutes. After one hour at 50°, the mixture is cooled to 25°. The hydantoin product precipitates on scratching, and after cooling to 0°, it is filtered, washed with cold water and dried in air, M.P. 232–235°, $\lambda_{max}^{Nji}$ 2.9, 3.0, 3.15, 5.68, 5.90μ

EXAMPLE 14

DL-α-methyl-3,4-dihydroxyphenylalanine

A suspension of 900 mg. of α-methyl-α-(3,4-dihydroxybenzyl)-hydantoin in 10 ml. of 6 N hydrochloric acid under nitrogen in a heavy walled glass tube is kept at 170° for 6 hours. After the tube is cooled to 0°, it is opened and the reaction mixture concentrated to dryness under reduced pressure. The dry residue is triturated with 20 ml. acetone, the latter extract is treated with charcoal and filtered. To the acetone filtrate is added 3 ml.

of propylene oxide and 3 ml. of water. The product, DL-α-methyl-3,4 - dihydroxyphenylalanine, precipitates from solution. After 2 hours at 0°, it is filtered, washed with acetone and dried in air to give material identical with authentic DL-α-methyl-3,4-dihydroxyphenylalanine by M.P., infrared and paper-chromatographic criteria.

EXAMPLE 15

*DL-α-amino-α-(3,4-dihydroxybenzyl)-propionitrile*

(A) To a stirred solution of 4 g. of potassium cyanide and 3.3 g. of ammonium chloride in 35 ml. of water is added 5 g. of 3,4-dihydroxyphenylacetone and the mixture kept at 55° for 5 hours. On concentration and cooling, the aminonitrile hydrochloride precipitates and it is filtered, washed with cold water, and dried in air.

(B) To a stirred solution of 8 g. of 3,4-dihydroxyphenylacetone at 10–15° in 30 ml. of toluene is added 0.80 g. of liquid ammonia and 1.4 g. of liquid hydrogen cyanide (dropwise). After 8 hours the precipitated aminonitrile is filtered and dried in air.

EXAMPLE 16

*DL-α-methyl-3,4-dihydroxyphenylalanine*

The 3,4-dihydroxy aminonitrile (or hydrochloride) (2 g.) in 20 ml. of 6 N hydrochloric acid under nitrogen in a thick-walled glass tube is kept at 170° for 6 hours. The product is worked up and isolated as described in Example 14.

We claim:

1. A process for converting an α-lower alkyl-3,4-dihydroxyphenylalanine to a 3,4-dialkoxy benzyl lower alkyl ketone which comprises, in combination, the steps of:
   (a) Admixing said alanine with a compound selected from the group consisting of the anhydrides and halides of an acid selected from the group consisting of alkanoic acids having up to 5 carbon atoms, acrylic acid, crotonic acid, benzoic acid, toluic acid, phenylacetic acid and cinnamic acid to form an O,O,N-triacyl derivative;
   (b) contacting said O,O,N-triacyl derivative with an aqueous alkali under an inert atmosphere to form an N-monoacyl derivative;
   (c) contacting said N-monoacyl derivative in an alkaline solution with a compound selected from the group consisting of a lower alkyl halide and a lower alkyl sulfate to form an N-acyl dialkoxy alanine ester;
   (d) heating to reflux said ester with an aqueous acid, said acid having at least one ionization constant greater than $10^{-5}$, to form a di (lower alkoxy) phenylalanine compound; and
   (e) admixing said phenylalanine compound with a reagent selected from the group consisting of sodium hypochlorite, sodium hypobromite, calcium hypochlorite, and t-butyl hypochlorite in an aqueous alkali to form the desired ketone.

2. A process of preparing 3,4-dimethoxybenzyl methyl ketone from α-methyl-3,4-dihydroxyphenylalanine which comprises, in combination, the steps of:
   (a) Admixing said alanine with an alkanoic acid anhydride, said alkanoic acid having up to 5 carbon atoms therein to form the O,O,N-triacyl alanine;
   (b) contacting said O,O,N-triacyl alanine compound with an aqueous potassium hydroxide solution under an inert oxygen-free atmosphere to form an N-monoacyl alanine compound;
   (c) adding an excess of dimethyl sulfate in sufficient additional potassium hydroxide to keep the mixture alkaline to form an α-methyl-N-acyl-dimethoxyphenylalanine methyl ester;
   (d) heating to reflux said dimethoxy alanine ester in an aqueous mineral acid solution to form a dimethoxy phenylalinine; and
   (e) admixing said dimethoxybenzyl compound in an aqueous alkali with a reagent selected from the group consisting of sodium hypochlorite and sodium hypobromite to form the dimethoxybenzyl methyl ketone.

3. A process of preparing a 3,4-dihydroxybenzyl lower alkyl ketone from an α-lower alkyl 3,4-dihydroxyphenylalanine which comprises treating the said alanine in aqueous medium under an inert atmosphere with a reagent selected from the group consisting of sodium hypochlorite, sodium hypobromite, calcium hypochlorite and t-butyl hypochlorite, to effect removal of the amino group and decarboxylation.

4. A process of preparing 3,4-dihydroxybenzyl methyl ketone from α-methyl-3,4-dihydroxyphenylalanine which comprises treating said alanine under an inert atmosphere in alkaline medium with a reagent selected from the sodium hypochlorite and sodium hypobromite to form the said ketone.

5. A process of preparing a 3,4-dialkoxybenzyl lower alkyl ketone from an α-lower alkyl-3,4-dialkoxyphenylalanine which comprises treating said alanine under an inert atmosphere in aqueous medium with a reagent selected from the group consisting of sodium hypochlorite, sodium hypobromite, calcium hypochlorite and t-butyl hypochlorite, to effect removal of the amino group and decarboxylation.

6. A process of preparing 3,4-dimethoxybenzyl methyl ketone from α-methyl-3,4-dimethoxyphenylalanine which comprises treating said alanine under an inert atmosphere in alkaline medium with a reagent selected from the group consisting of sodium hypochlorite and sodium hypobromite.

7. A process of preparing 3,4-dihydroxybenzyl methyl ketone from α-methyl-3,4-dihydroxyphenylalanine which comprises treating said alanine, under an inert atmosphere in alkaline medium containing borate ion, with a reagent selected from the group consisting of sodium hypochlorite and sodium hypobromite.

8. A process of preparing a 3,4-monoalkoxymonohydroxybenzyl lower alkyl ketone from an α-lower alkyl-3,4-monoalkoxymonohydroxyphenylalanine which comprises treating said alanine under an inert atmosphere in aqueous medium with a reagent selected from the group consisting of sodium hypochlorite, sodium hypobromite, calcium hypochlorite and t-butyl hypochlorite, to effect removal of the amino group and decarboxylation.

9. A process of preparing a compound selected from the group consisting of a 3-alkoxy-4-hydroxybenzyl lower alkyl ketone and a 3,4-dialkoxybenzyl lower alkyl ketone from an α-lower alkyl-3,4-dihydroxyphenylalanine which comprises, in combination, the steps of:
   (1) stirring said alanine in an alkaline aqueous solution containing an excess of alkali with not more than 4 moles of dialkylsulfate per mole of said alanine; and
   (2) treating the resulting solution of methylated dihydroxyphenylalanine with a reagent selected from the group consisting of sodium hypochlorite, sodium hypobromite, calcium hypochlorite and t-butyl hypochlorite under an inert atmosphere to effect removal of the amino group and decarboxylation.

References Cited

UNITED STATES PATENTS 2,868,818  1/1959  Pfister et al. _____ 260—518

OTHER REFERENCES

Almond et al., Biochemistry 1, 243–249 (1962) cited in Chem. Abstracts 57, 2578d (1962).

Karvas et al., Chem. Abs. 54, 22698h (1960).

LEON ZITVER, *Primary Examiner.*

DANIEL D. HORWITZ, *Examiner.*